US007746331B2

(12) United States Patent
Tai et al.

(10) Patent No.: US 7,746,331 B2
(45) Date of Patent: *Jun. 29, 2010

(54) SOURCE-FOLLOWER TYPE ANALOGUE BUFFER, COMPENSATING OPERATION METHOD THEREOF, AND DISPLAY THEREWITH

(75) Inventors: Ya-Hsiang Tai, Hsinchu (TW); Cheng-Chiu Pai, Hemei Township (TW)

(73) Assignee: TPO Displays Corp., Chu-Nan (TW)

( * ) Notice: Subject to any disclaimer, the term of this patent is extended or adjusted under 35 U.S.C. 154(b) by 1151 days.

This patent is subject to a terminal disclaimer.

(21) Appl. No.: 11/356,160

(22) Filed: Feb. 16, 2006

(65) Prior Publication Data

US 2007/0052650 A1 Mar. 8, 2007

(30) Foreign Application Priority Data

Aug. 19, 2005 (TW) .............................. 94128342 A

(51) Int. Cl.
*G06F 3/038* (2006.01)
*G09G 5/00* (2006.01)

(52) U.S. Cl. ...................................................... 345/204

(58) Field of Classification Search ........... 345/30–111, 345/204–215, 1.1–3.4
See application file for complete search history.

(56) References Cited

U.S. PATENT DOCUMENTS

| | | | | |
|---|---|---|---|---|
| 6,069,650 | A | 5/2000 | Battersby | |
| 6,127,997 | A | 10/2000 | Tsuchi | |
| 6,552,708 | B1 | 4/2003 | Wang et al. | |
| 6,624,669 | B1 | 9/2003 | Tsuchi | |
| 6,801,161 | B2 * | 10/2004 | Lehtomaki et al. | 342/377 |
| 7,405,720 | B2 * | 7/2008 | Nakajima et al. | 345/100 |
| 2007/0040591 | A1 * | 2/2007 | Yu et al. | 327/108 |
| 2007/0052650 | A1 * | 3/2007 | Tai et al. | 345/98 |

OTHER PUBLICATIONS

Pai, Cheng-Chiu, et al, "A Novel Analogue Buffer Using Poly-Si TFTs for Active Matrix Displays", IDMC 2005, pp. 483-486.
Pai, Cheng-Chiu, et al, "P-44: A New Analogue Buffer Using Poly-Si TFTs with Deviation Less Dependent on the Gray Level for Active Matrix Displays", SID '05 Digest, pp. 1-4.

* cited by examiner

*Primary Examiner*—Srilakshmi K Kumar
(74) *Attorney, Agent, or Firm*—Liu & Liu

(57) ABSTRACT

A source-follower-type analogue buffer with an active load, a new compensating operation and a display with the source-follower-type analogue buffers are developed to minimize the variation from both the charging time and the device characteristics and maximize the range of the input voltage. In the source-follower-type analogue buffer, during a compensation period, a voltage drop is stored in a proposed storage capacitor, and during a data-input period, the output voltage is compensated by the voltage stored in the storage capacitor.

11 Claims, 11 Drawing Sheets

SOURCE-FOLLOWER TYPE ANALOGUE BUFFER, COMPENSATING OPERATION METHOD THEREOF, AND DISPLAY THEREWITH

BACKGROUND OF THE INVENTION

1. Field of Invention

The present invention relates to an analogue buffer. More particularly, the present invention relates to a source-follow type analogue buffer using poly-Si TFTs for an active matrix display.

2. Description of Related Art

Low temperature poly-Si (LTPS) thin film transistors (TFTs) allow for peripheral integration of driving circuits with a pixel panel of an active matrix display due to a high current driving capability. However, it is well known that the integration of whole driving circuit with poly-Si TFTs is very difficult due to the rather poor characteristics and non-uniformity of poly-Si TFTs compared with single crystal Si large scale integrated circuits (LSIs). Among the driving circuits using poly-Si TFTs, analogue buffers are indispensable to drive the load capacitance of the data bus in the panel. Source follower is considered an excellent candidate for the analogue buffer circuit for the "System on Panel (SOP)" application because of its simplicity and low power dissipation.

A typical source follower 100 using a LTPS TFT in an active matrix display is shown in FIG. 1A. The gate of the TFT 110 in the source follower 100 coupled to a input voltage Vin and the drain of the TFT 110 is coupled to an operation voltage Vdd. The source of the TFT 110 is coupled to ground through a load capacitor (Cload). The waveform of output voltage Vout of the source follower 100 is depicted in FIG. 1B. It is observed that the final output voltage Vout is not kept constant, but exceeds the value of Vin-Vth expected in principle, where the Vth is a threshold voltage of the TFT 110. It is ascribed to the sub-threshold current. As shown in FIG. 1C, which depicts drain current ($I_D$) and the voltage between gate and source of the TFT 110 ($V_{GS}$) curves, the sub-threshold swing of LTPS TFTs is about 0.3V/dec which is much larger than that of a metal-oxide-semiconductor field effect transistor (MOSFET) (0.06V/dec). Consequently, the typical source follower 100, as an analogue buffer for active matrix display, will be sensitive to the charging time for various product specifications such as frame rates for the active matrix displays and can not have a constant output voltage.

SUMMARY OF THE INVENTION

Accordingly, the present invention is directed to provide a source-follower type analogue buffer with an active load and a new compensating operation method is developed to minimize the variation from both the charging time and the device characteristics and maximize the range of the input voltage.

In one embodiment of the present invention, an analogue buffer and a display having a plurality of the source-follower type analogue buffers for driving the load capacitance of a plurality of data buses in the display are provided. The analogue buffer includes a storage capacitor, a driving transistor, a load capacitor and an active load. A first terminal of the storage capacitor is connected to an operation voltage (Vdd) source through a first switch, and a second terminal of the storage capacitor is connected to an input voltage (Vin) source through a third switch. A gate terminal of the driving transistor is connected to the first terminal of the storage capacitor, a drain terminal of the driving transistor is connected to the operation voltage source, a source terminal of the driving transistor is connected to the second terminal of the storage capacitor through a second switch. A first terminal of the load capacitor is connected to the source terminal of the driving transistor through a fourth switch, and a second terminal of the load capacitor is connected to ground, the voltage stored in the load capacitor is an output voltage of the analogue buffer. A first terminal of the active load is connected to the source terminal of the driving transistor, and a second terminal of the active load is connected to the ground, the active load is controlled by a bias voltage.

In one embodiment of the present invention, a compensating operation method of the analogue buffer above is provided. During a compensation period, the first switch and the second switch are turned on, thereby a voltage drop is stored in the storage capacitor; and during a data-input period, the input voltage is shifted to a logic high level, the first switch and the second switch are turned off, and the third switch and the fourth switch are turned on, the gate terminal of the driving transistor is applied with the input voltage and the voltage difference hold in the storage capacitor, thereby an output voltage of the analogue buffer is compensated by the voltage stored in the storage capacitor.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a source-follower type analogue buffer with an active load and a new compensating operation method is developed to minimize the variation from both the charging time and the device characteristics and maximize the range of the input voltage.

Figure 1A:
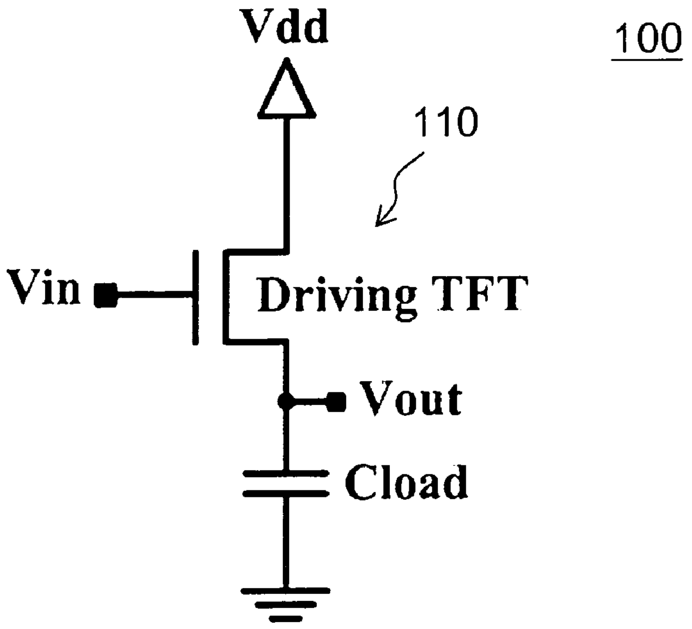
FIG. 1A is a schematic block diagram of a typical source follower using a LTPS TFT in an active matrix display.
Figure 1B:
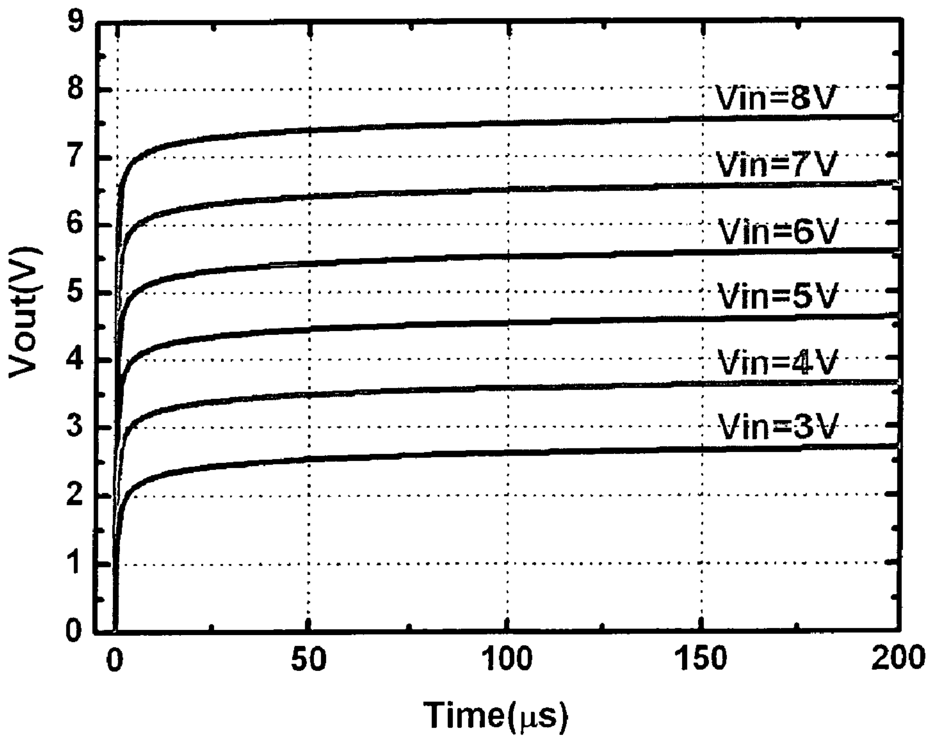
FIG. 1B shows a waveform of output voltage Vout of the source follower of FIG. 1A.
Figure 1C:
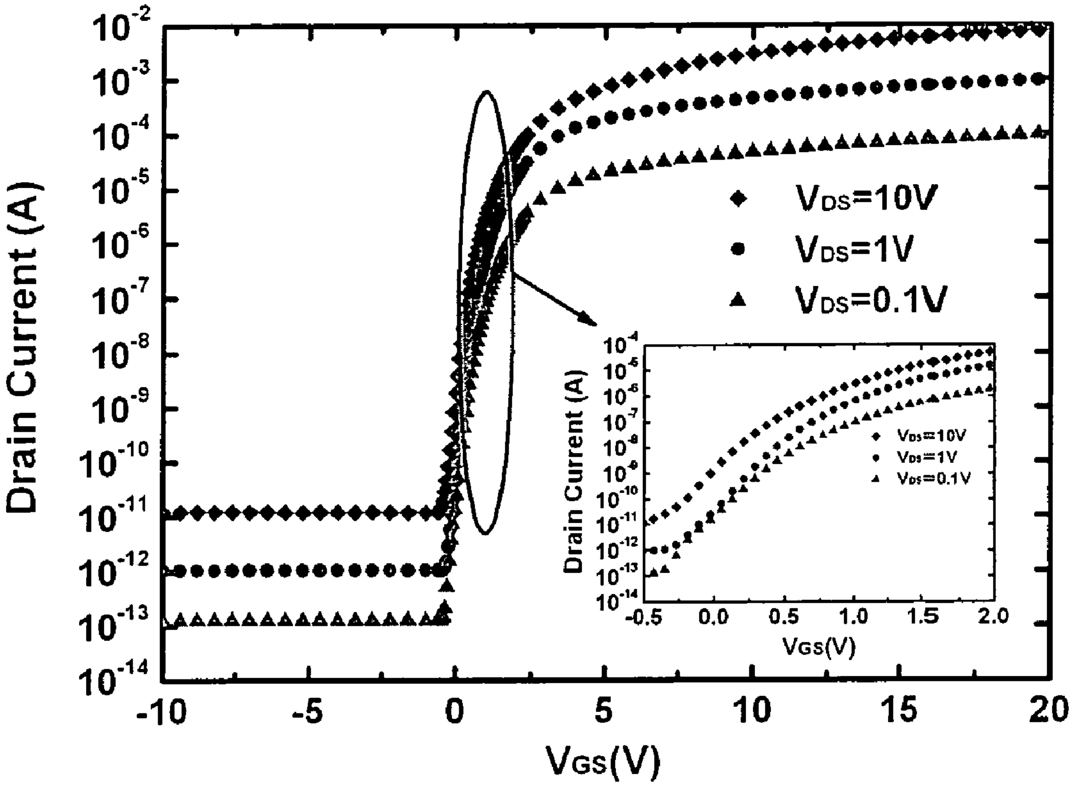
FIG. 1C depicts drain current ($I_D$) and the voltage between gate and source of the TFT 110 ($V_{GS}$) curves of FIG. 1A.
Figure 2A:
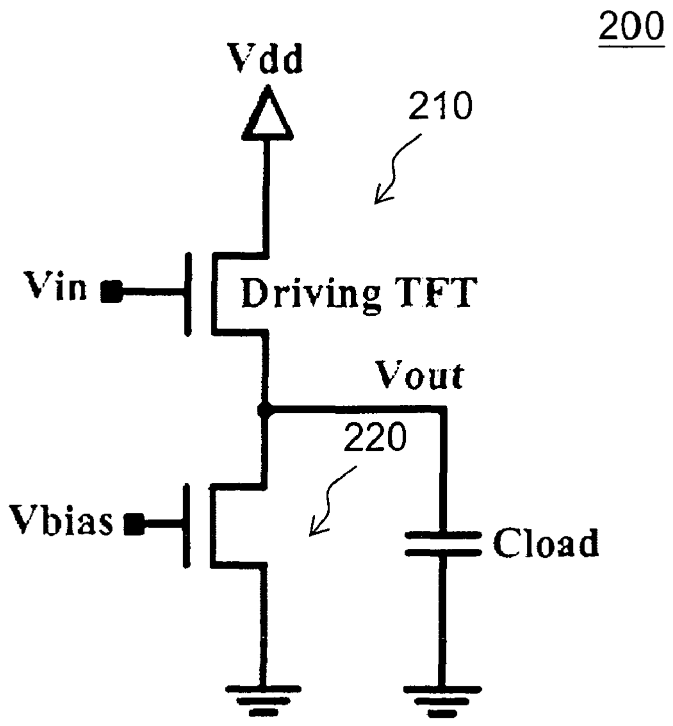
FIG. 2A shows a source follower of the present invention.
Figure 2B:
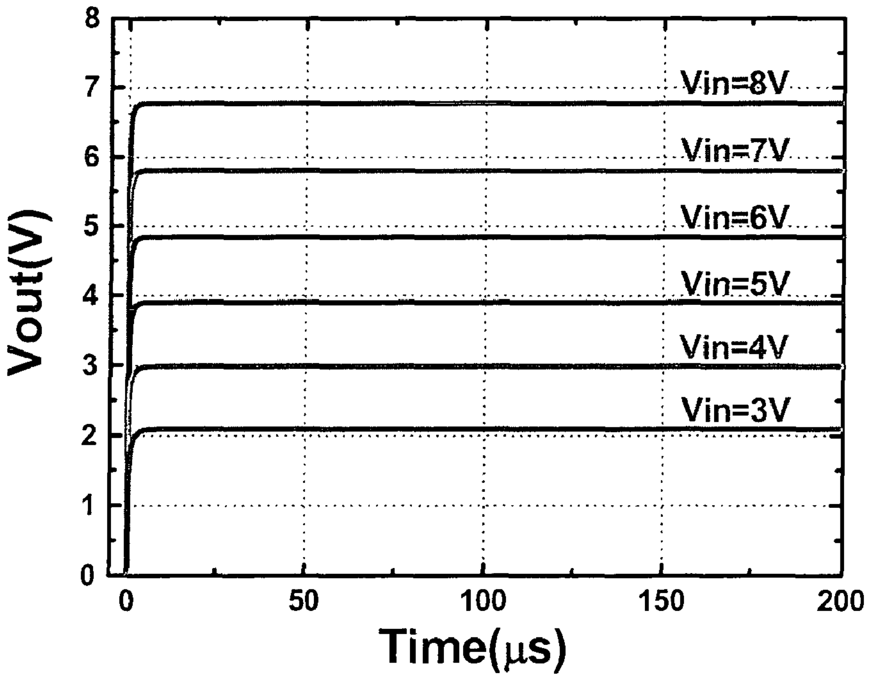
FIG. 2B shows a output voltage waveform of the source follower of FIG. 2A.

In the proposed source follower 200 of the present invention, as shown in FIG. 2A, an active load 220, a thin film transistor (TFT) shown in FIG. 2A, is added. The active load 220 is designed to have a larger channel length (L) for minimizing the DC current and reducing the kink effect. The output voltage Vout waveform is shown in FIG. 2B. It is distinct that the unsaturated phenomenon of the output voltage Vout is diminished. As a result, the source follower 200 with active load is superior to possess charging time variation-tolerant characteristics.

Figure 2C:
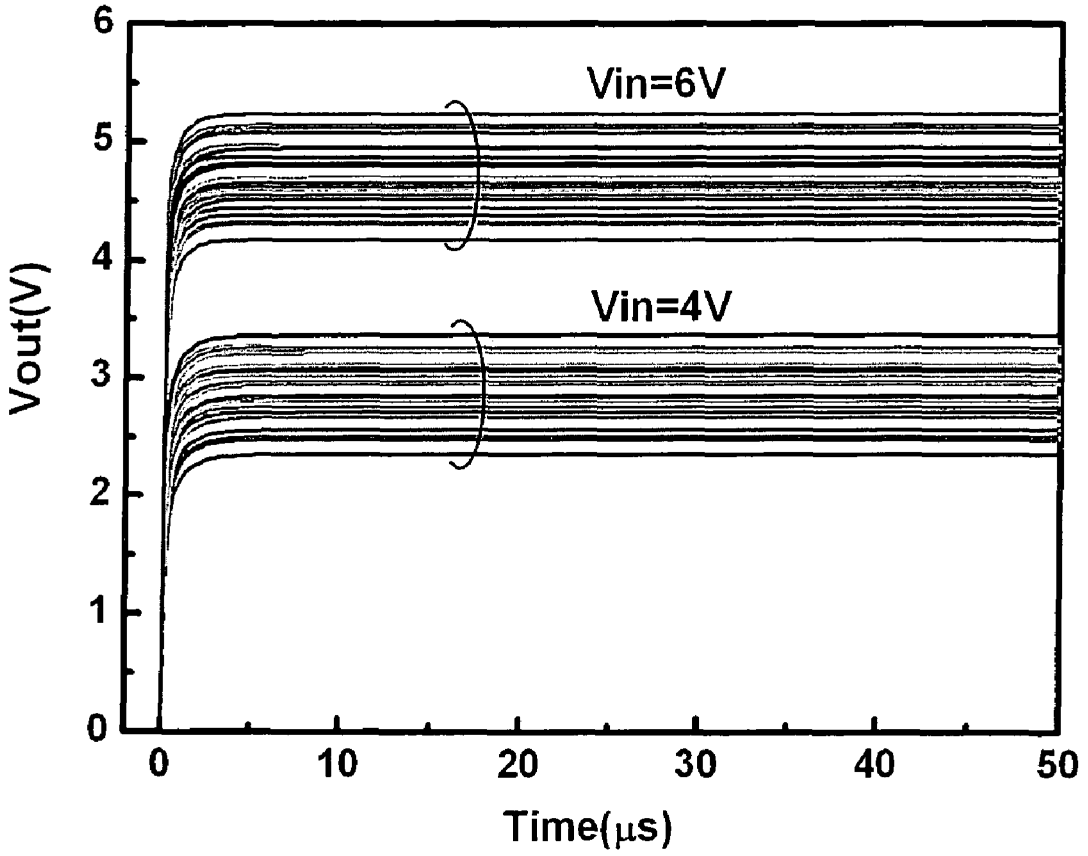
FIG. 2C shows a Monte Carlo simulation results of the output voltage (Vout) versus the operation time of the source follower of FIG. 2A when the input voltage is 4V or 6V.

However, if the proposed source follower of FIG. 2A is directly applied to the analogue buffers in the active matrix display, the variations of the LTPS thin film transistors (TFTs), such as threshold voltage or mobility etc., are considered for applications. Please also refer to FIG. 2C, which show the simulated output voltage (Vout) waveform versus the operation time of the source followers where the same input voltage Vin, which is 4 volts or 6 volts, is applied thereto. It is clear that the typical source followers suffer from huge variations due to the LTPS TFTs variation.

Figure 3A:
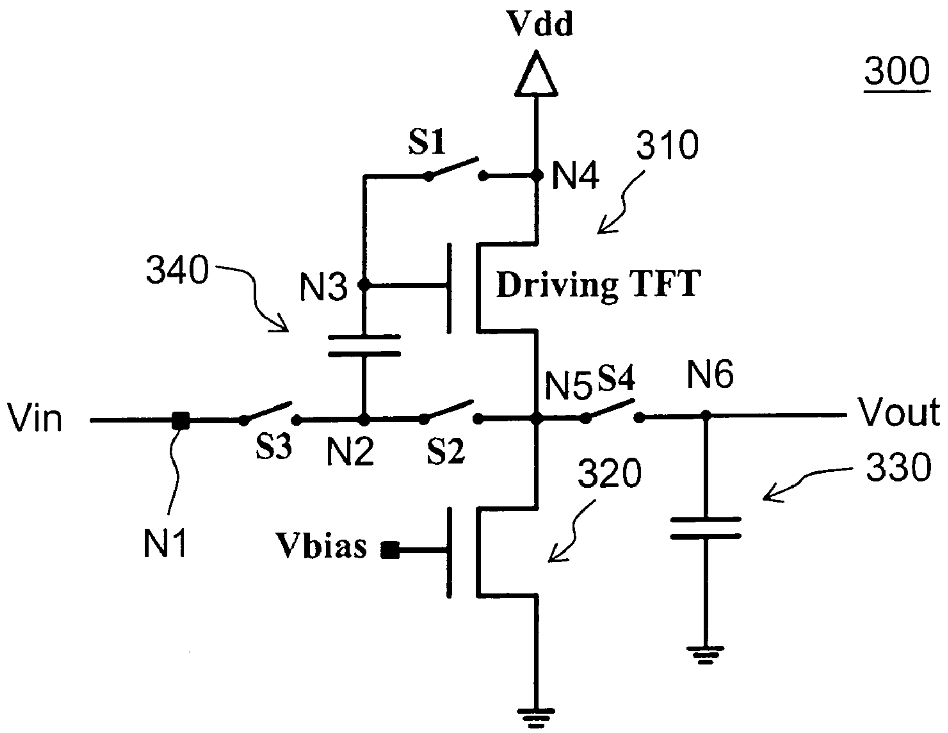
FIG. 3A shows a source-follower type analogue buffer with an active load of a preferred embodiment of the present invention.

Please refer to FIG. 3A, a source-follower type analogue buffer 300 with an active load 320 is provided as a preferred embodiment of the present invention. The source-follower type analogue buffer 300 includes a driving TFT 310, an active load 320, a load capacitor 330, a storage capacitor 340 and a plurality of switches S1~S4. The driving TFT 310 is a thin film transistor (TFT), for example, a Low temperature poly-Si TFT. The active load 320 is a thin film transistor (TFT) and an gate terminal is constantly biased at a voltage level Vbias.

Node N1 which is coupled to an input voltage Vin is connected to node N2 under control of the switch S3. Node N2 is connected to one terminal of the storage capacitor 340 and is further connected to node N5 under control of the switch S2. Node N3 is connected to the other terminal of the storage capacitor 340 and a gate terminal of the driving TFT 310, and is further connected to node N4 under control of the switch Si. Node N4 is coupled to an operation voltage Vdd and is also connected to a drain terminal of the driving TFT 310. Node N5 is connected to the active load 320 and a source terminal of the driving TFT 310, and is further connected to node N6 under control of the switch S4. Node N6 is connected to the load capacitor 330. The voltage level of the node N6 is an output voltage Vout of the source-follower-type analogue buffer 300.

Figure 3B:
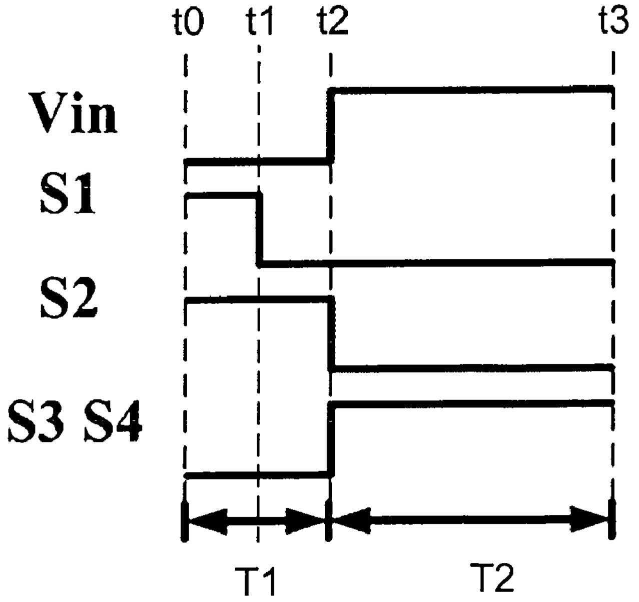
FIG. 3B and FIG. 3C show a respective compensating operation of the present invention applied to the source-follower type analogue buffer of FIG. 3A.
Figure 3C:
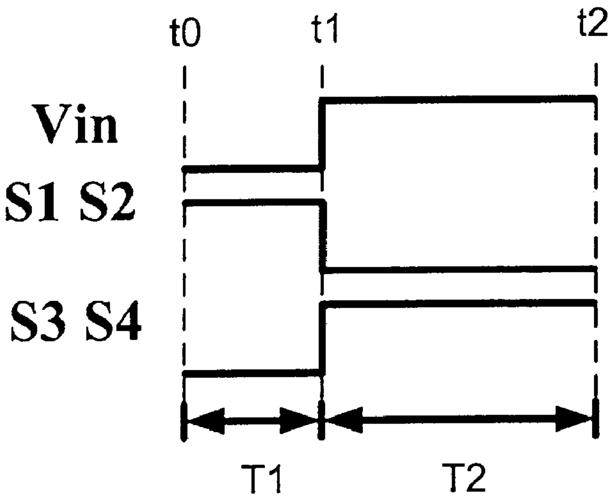

A compensating operation method is proposed in the present invention to minimize the variation from both the charging time and the device characteristics and maximize the range of the input voltage. Alternative embodiments of the present invention for the operating principle are depicted in FIG. 3B and FIG. 3C, for example. Please refer to FIG. 3B first, accompanying with the analogue buffer 300 shown in FIG. 3A. At time t0, the gate voltage of the TFT as the active load 320 is constantly biased at the voltage level Vbias. During a compensation period T1, switches S1 and S2 are turned on from time t0 to time t1, and at time t1, the switch S1 is turned off. At the end of the compensation period T1, that is, time t2, the switch S2 is turned off. Thereby, a voltage drop is stored in the storage capacitor 340.

During a data-input period T2, an input voltage Vin is shifted to a logic high level and applied to node N1, and the switches S3 and S4 are turned on. The gate terminal of the driving TFT 310 is applied with the input voltage Vin voltage and the voltage difference hold in the storage capacitor 340. Thus, the output voltage is compensated by the voltage stored in the storage capacitor 340.

Please refer to FIG. 3C for the other alternative embodiment of compensating operation, accompanying with the analogue buffer 300 shown in FIG. 3A. At time t0, the gate voltage of the TFT as the active load 320 is constantly biased at the voltage level Vbias. During a compensation period T1, switches S1 and S2 are turned on for the whole compensation period T1. At the end of the compensation period T1, that is, time t1, the switches S1 and S2 are turned off. Thereby, a voltage drop is stored in the storage capacitor 340. During a data-input period T2, an input voltage Vin is shifted to a logic high level and applied to node N1, and the switches S3 and S4 are turned on. The gate terminal of the driving TFT 310 is applied with the input voltage Vin voltage and the voltage difference hold in the storage capacitor 340. Thus, the output voltage is compensated by the voltage stored in the storage capacitor 340.

Figure 4A:
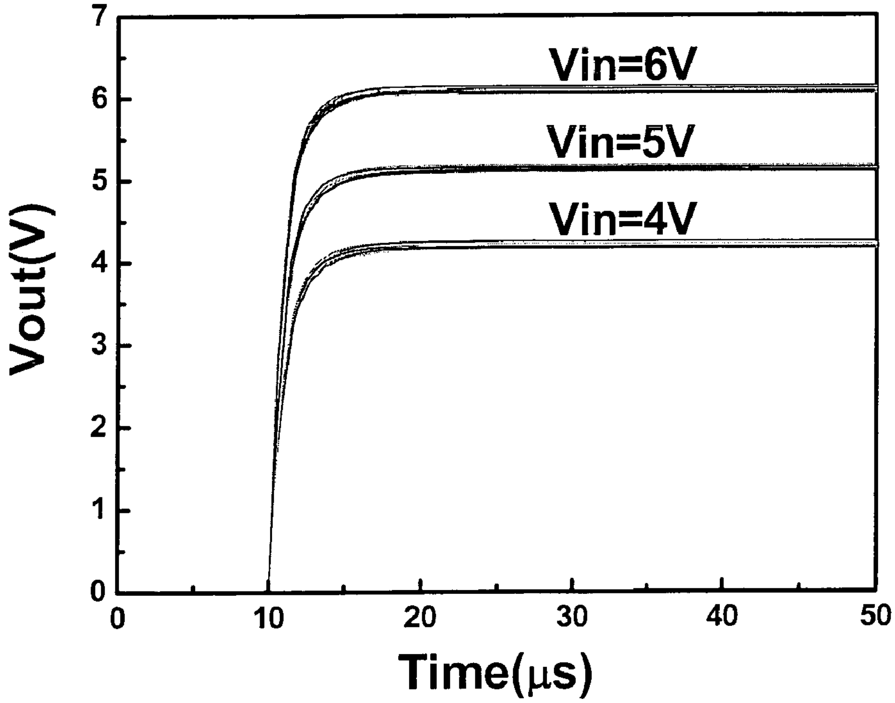
FIG. 4A shows a Monte Carlo simulation results of the source-follower type analogue buffer of FIG. 3A when the input voltage is 4V, 5V or 6V.
Figure 4B:
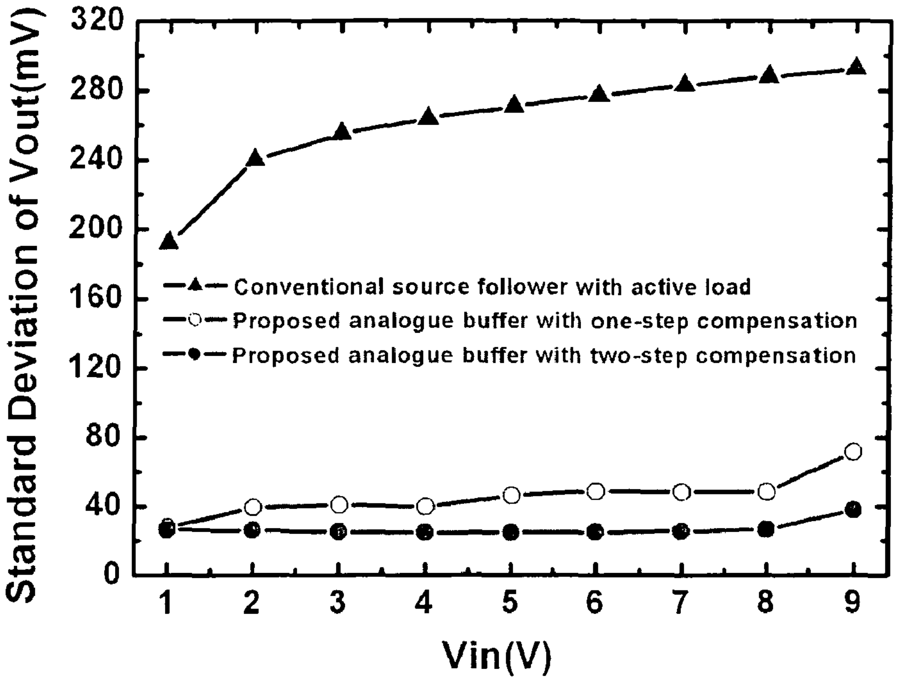
FIG. 4B shows the Standard Deviation of Vout with respect to Vin for conventional source follower with active load, proposed analogue buffer with one-step compensation and proposed analogue buffer with two-step compensation.
Figure 4C:
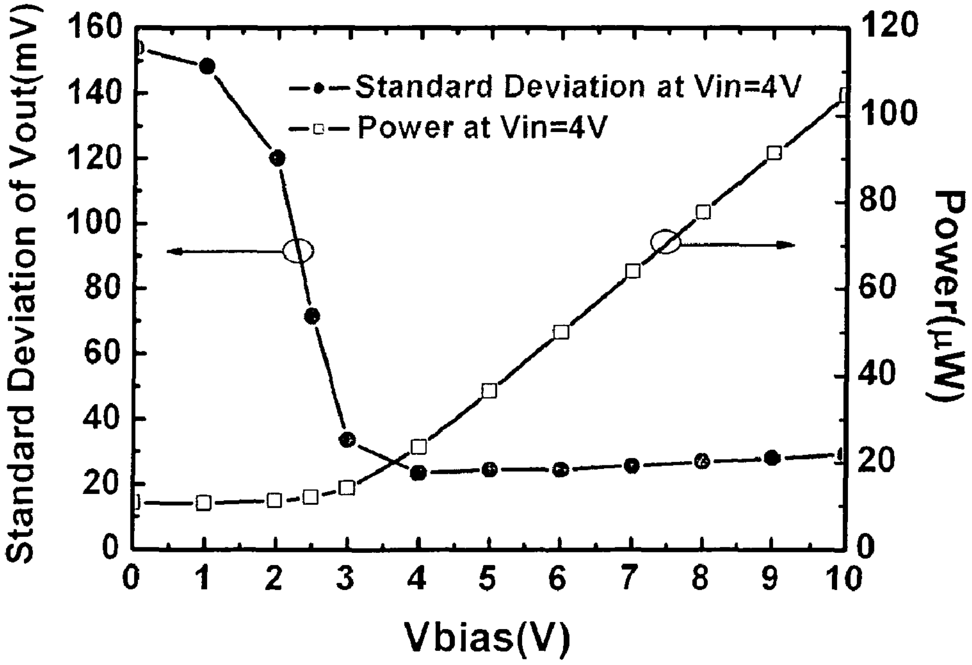
FIG. 4C shows the Standard deviation of Vout and Power with respect to Vbias at Vin=4V.

The Monte Carlo simulation results of the source-follower type analogue buffer 300 of FIG. 3A when the input voltage is 4V, 5V or 6V, are shown in FIG. 4A, which show the simulated output voltage (Vout) waveform versus the operation time of the source-follower type analogue buffer 300. To study the effect of the device variation on circuit performance, Monte Carlo simulation with an assumption of normal distribution is executed where in the mean value and the deviation of the threshold voltage and mobility are 1V, 1V, 77.1 $cm^2/vs$ and 20 $cm^2/vs$, respectively. Each of the LTPS TFTs in the circuit simulation varies independently. Comparing the results of source follower 200 of FIG. 2A, it is clear that the source followers 200 suffer from much more variations due to the LTPS TFTs variation than the source-follower-type analogue buffer 300 of FIG. 3A.

The source-follower-type analogue buffer of the present invention has characteristics of high immunity to the variation of poly-Si TFT characteristics, capability of simple configuration, low power consumption and capability of minimizing the signal timing variation (that is, unsaturated phenomenon). The source-follower-type analogue buffer of the present invention is suitable for use in an active matrix display, for example, an active matrix liquid crystal display (AMLCD) or an active matrix organic light emitting display (AMOLED). More particularly, the source-follower-type analogue buffer of the present invention is suitable for use in the "System on Panel" applications for the AMLCD or AMOLED. The proposed analogue buffers are indispensable to drive the load capacitance of the data bus in the panel among the driving circuits using poly-Si TFTs.

Figure 5A:
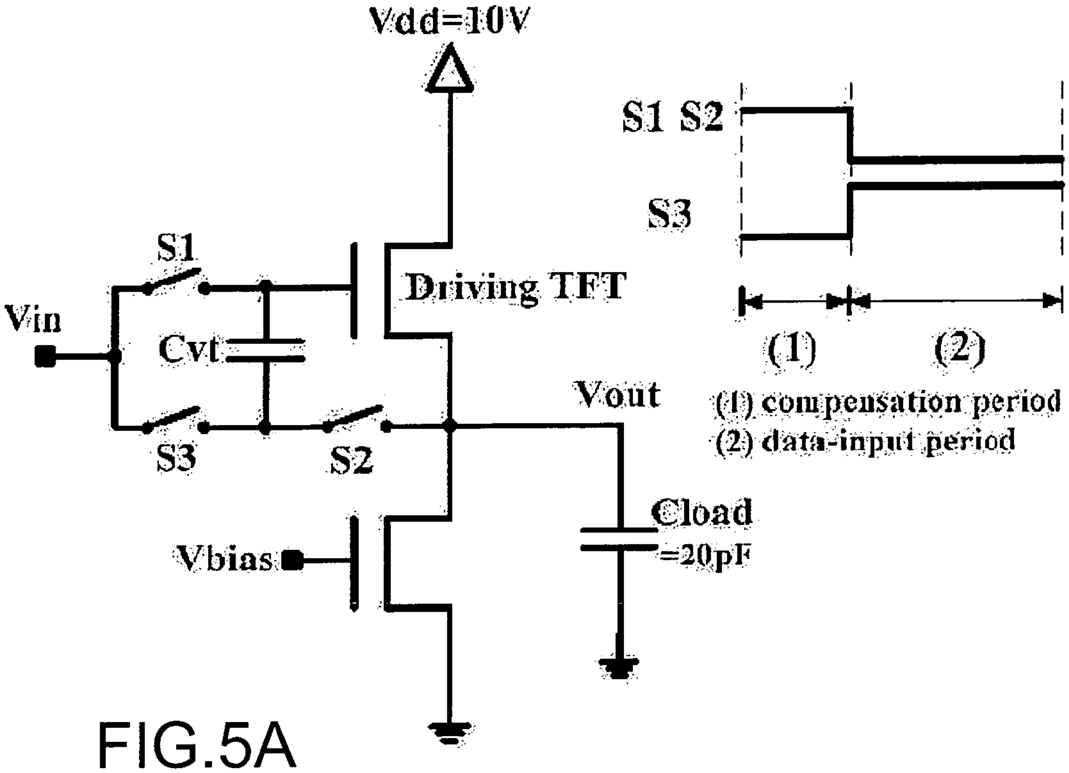
FIG. 5A, which shows a schematic of the Chung's analogue buffer with an active load and its operation principles.
Figure 5B:
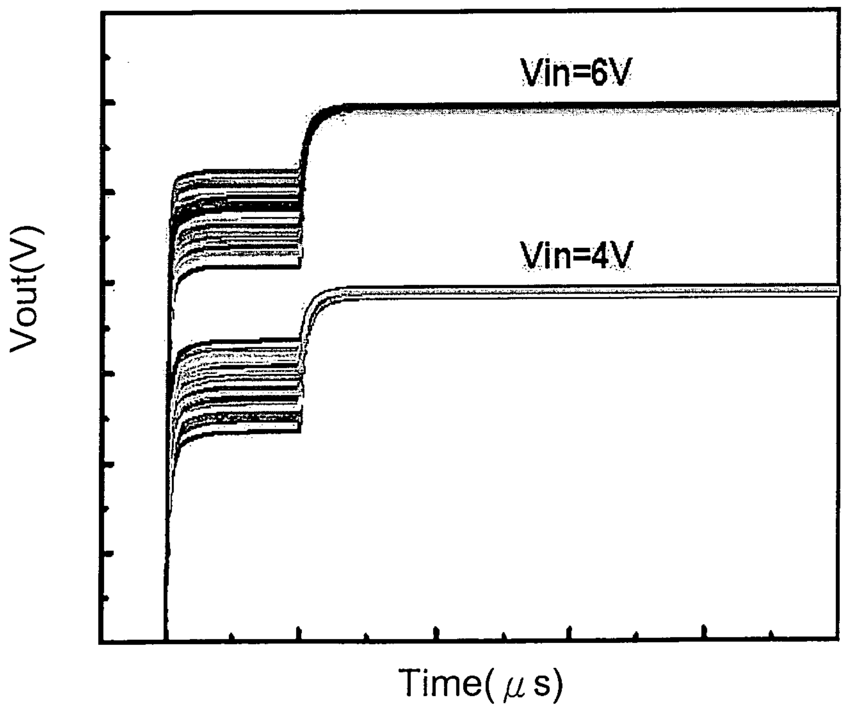
FIG. 5B shows the Monte Carlo simulation results of the output voltage variation of the Chung's analogue buffer of FIG. 5A.
Figure 6A:
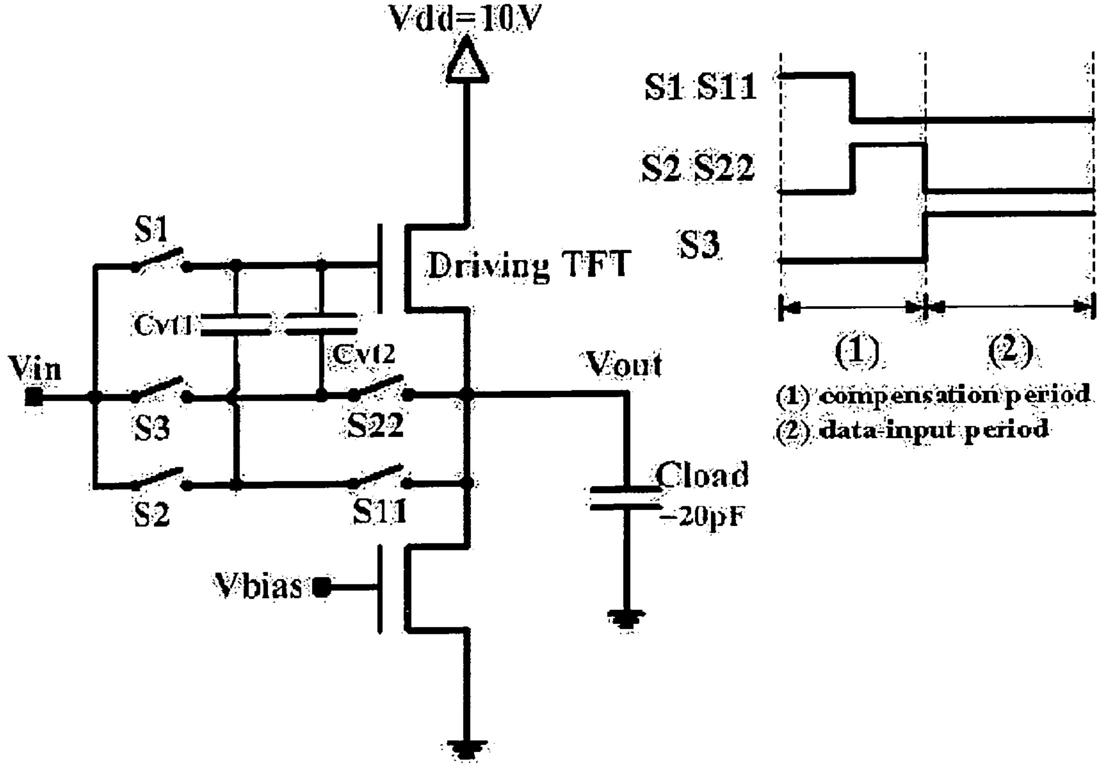
FIG. 6A shows a Kida's double offset canceling analogue buffer with an active load.
Figure 6B:
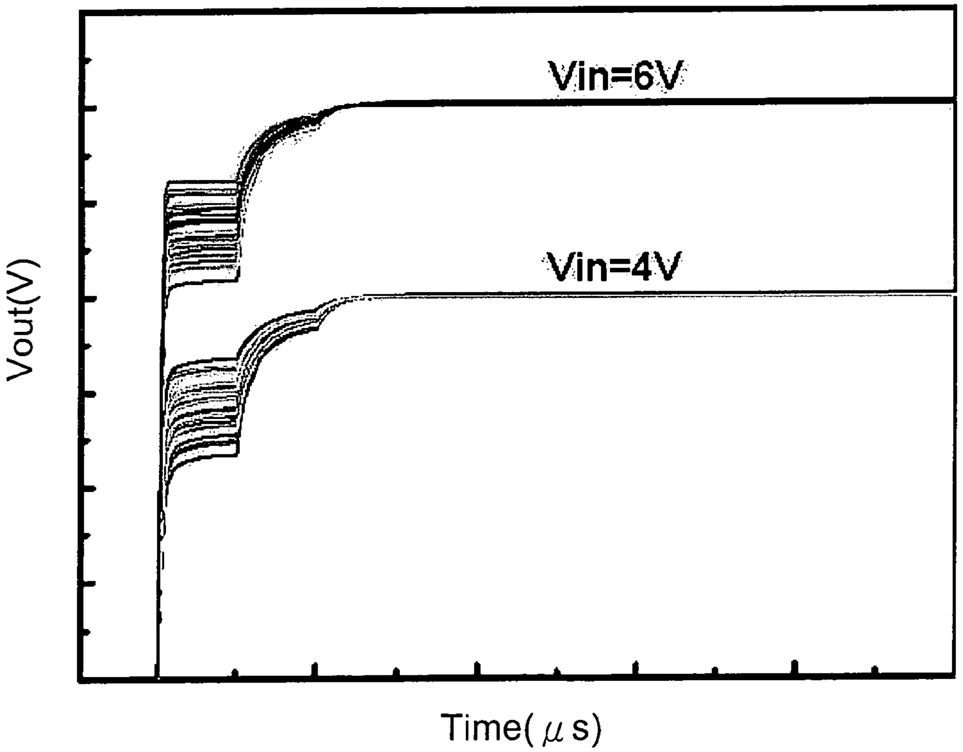
FIG. 6B shows the Monte Carlo simulation results of the output voltage variation of the Kida's double offset canceling analogue buffer with an active load.

Several conventional source-follower type analogue buffers with an active load are proposed in the art. Please refer to FIG. 5A, which shows a schematic of the Chung's analogue buffer with an active load and its operation principles (H. J. Chung, S. W. Lee and C. H. Han, IEE Electronics Letters, Vol. 37, p. 1093, 2001), and FIG. 5B shows the Monte Carlo simulation results of the output voltage variation. Please also refer to FIG. 6A, which shows Kida's analogue buffer (Y. Kida, Y. Nakajima, M. Takatoku, M. Minegishi, S. Nakamura, Y. Maki and T. Maekawa, EURODISPLAY, p. 831, 2002) with an active load and its Monte Carlo simulation results are also shown in FIG. 6B.

Figure 7A:
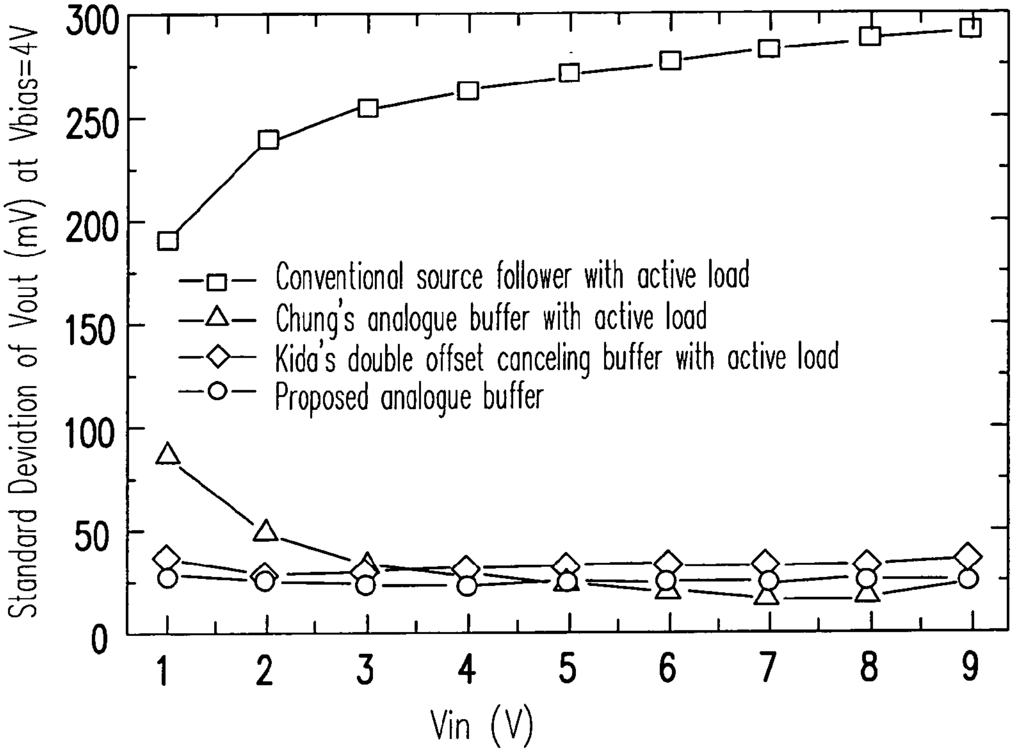
FIG. 7A shows results of comparing the standard deviations of output voltage in the conventional source follower, Chung's analogue buffer, Kida's double offset canceling analogue buffer and the proposed analogue buffer of the present invention calculated from the Monte Carlo simulation.
Figure 7B:
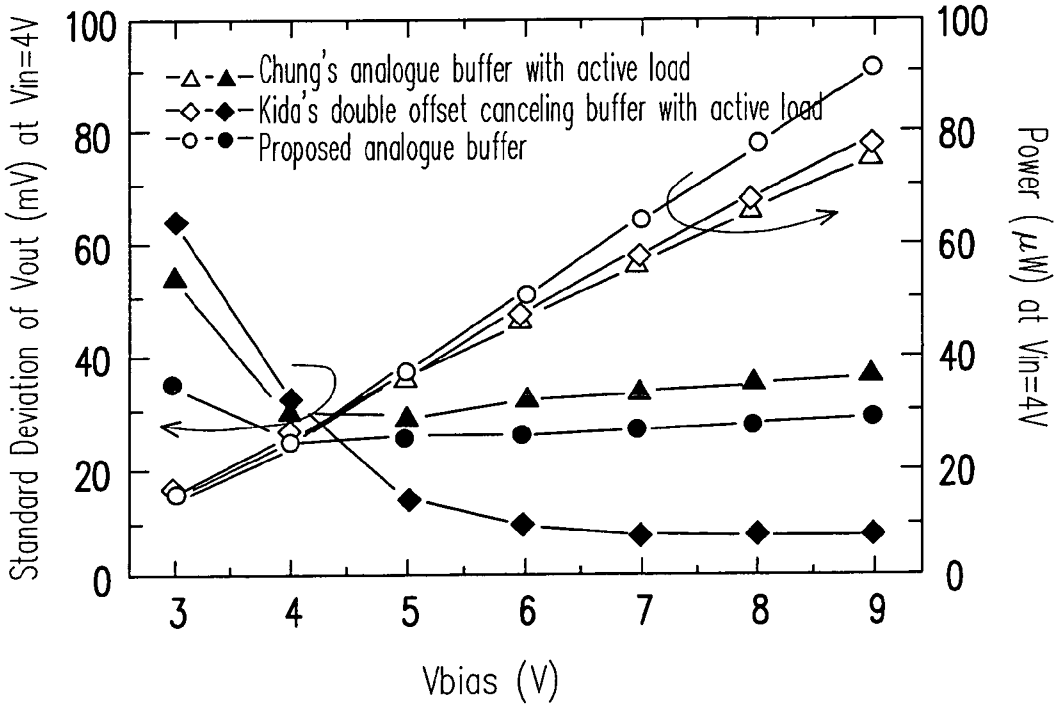
FIG. 7B shows results of the standard deviation of output voltage and the power consumption related to Vbias in the Chung's analogue buffer, Kida's double offset canceling analogue buffer and the proposed analogue buffer of the present invention from the Monte Carlo simulation.

Please refer to FIG. 7A, which compares the standard deviations of output voltage in the conventional source follower, Chung's analogue buffer, Kida's double offset canceling analogue buffer and the proposed analogue buffer of the present invention calculated from the Monte Carlo simulation results. All of the circuits include the active load to eliminate the unsaturated behavior. The merits of the proposed analogue buffer of the present invention including wide operation range and small deviation are distinguished over the prior arts. Furthermore, the deviation is less dependent on the input voltage, reflecting the good compensation of the proposed circuit. The standard deviation of output voltage and the power consumption related to Vbias are shown in FIG. 7B, which reveals that the Vbias should be properly designed to minimize the deviation with lowest power consumption.

Figure 8:
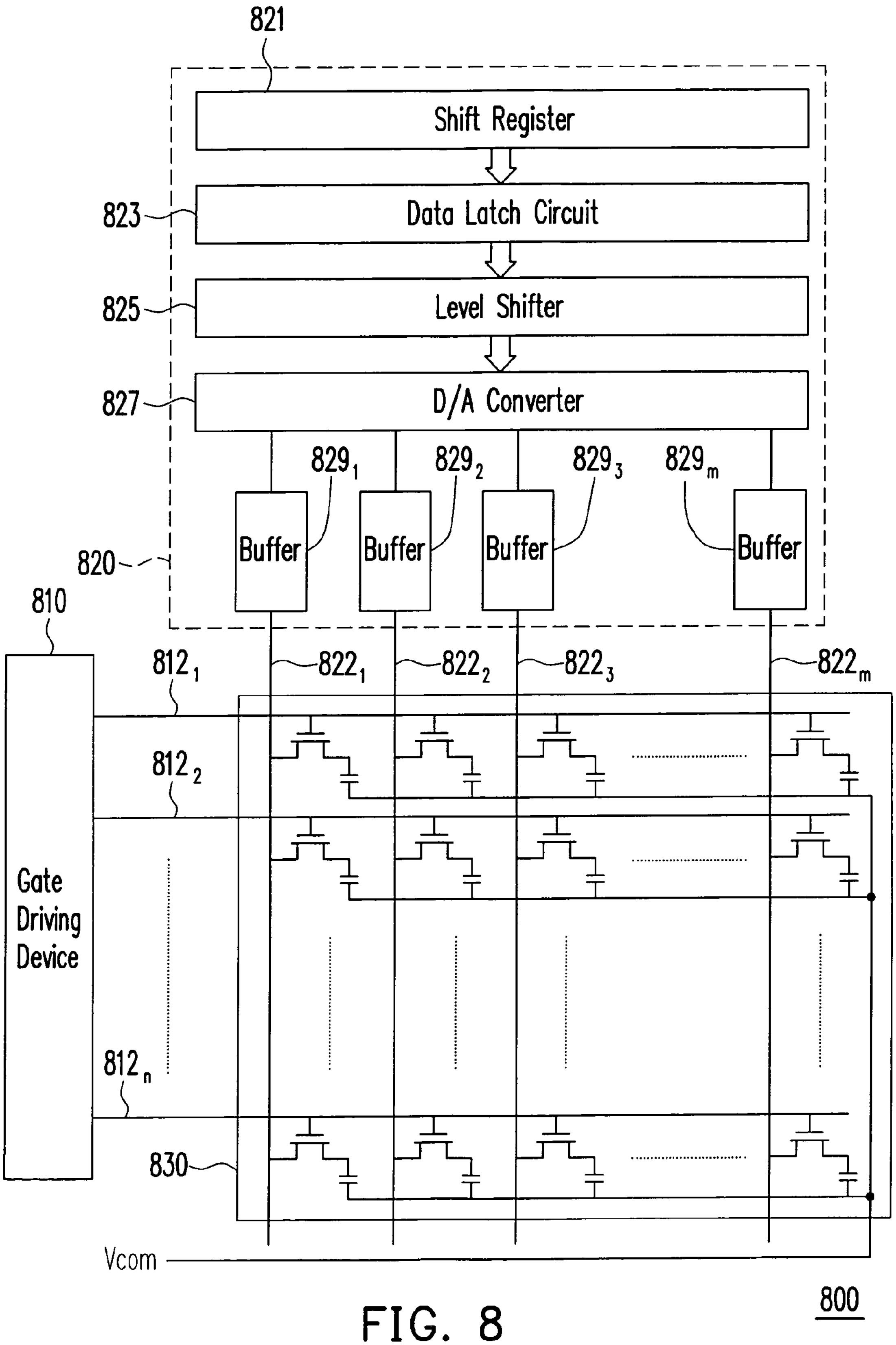
FIG. 8 shows an embodiment of the present invention relating to a display having a plurality of source-follower-type analogue buffers for driving the load capacitance of a plurality of data buses therein.

A source-follower type analogue buffer of the invention has characteristics of high immunity to the variation of poly-Si TFT characteristics, capability of simple configuration, low power consumption and capability of minimizing the signal timing variation (that is, unsaturated phenomenon), which is suitable for driving loads of multiple data bus in an active matrix display. The display has a plurality of source-follower-type analogue buffers for driving the load capacitance of a plurality of data buses in the display, which is shown in FIG. 8. The display 800 includes a panel 810, a gate driving device 810 and a source driving device 820. A plurality of gate lines, for example, n gate lines $\mathbf{812}_1$, $\mathbf{812}_2$, $\mathbf{812}_3$ . . . , $\mathbf{812}_n$ of the gate driving device 810 are connected to the panel 810, and a plurality of data lines, for example, m data lines $\mathbf{822}_1$, $\mathbf{822}_2$, $\mathbf{822}_3$ . . . , $\mathbf{822}_m$ of the source driving device 820 are connected to the panel 810, and the gate lines and the data lines are interconnected in an array manner. A plurality of pixels are interposed between the interconnections of the gate lines and the data lines.

The source driving device 820 includes, for example, a shift register 821, a data latch circuit 823, a level shifter 825, a digital/analog converter 827 and a buffer device 829. The buffer device 829 includes m buffer unit $\mathbf{829}_1$, $\mathbf{829}_2$, $\mathbf{829}_3$, . . . , $\mathbf{829}_m$ for coupling to the corresponding data lines $\mathbf{822}_1$, $\mathbf{822}_2$, $\mathbf{822}_3$ . . . , and $\mathbf{822}_m$. The buffer unit $\mathbf{829}_1$, $\mathbf{829}_2$, $\mathbf{829}_3$, . . . , $\mathbf{829}_m$ is the analogue buffers as introduced in the aforesaid embodiments of the present invention. The source-follower-type analogue buffers of the present invention is suitable for use in the "System on Panel" (SoP) applications for the AMLCD or AMOLED. The proposed analogue buffers are indispensable to drive the load capacitance of the data bus in the panel among the driving circuits using poly-Si TFTs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An source-follower type analogue buffer, comprising:

a storage capacitor, wherein a first terminal of the storage capacitor is connected to an operation voltage source through a first switch, a second terminal of the storage capacitor is connected to an input voltage source through a third switch;

a driving transistor, wherein a gate terminal of the driving transistor is connected to the first terminal of the storage capacitor, a drain terminal of the driving transistor is connected to the operation voltage source, a source terminal of the driving transistor is connected to the second terminal of the storage capacitor through a second switch; and an active load, wherein a first terminal of the active load is connected to the source terminal of the driving transistor, and a second terminal of the active load is connected to the ground, the active load is controlled by a bias voltage.

2. The source-follower type analogue buffer as claimed in claim 1, wherein the driving transistor is a low temperature poly-Si (LIPS) thin film transistor (TFT).

3. The source-follower type analogue buffer as claimed in claim 1, wherein the active load is a low temperature poly-Si (LIPS) thin film transistor (TFT).

4. The source-follower type analogue buffer as claimed in claim 1, further comprising a load capacitor, wherein a first terminal of the load capacitor is connected to the source terminal of the driving transistor through a fourth switch, a second terminal of the load capacitor is connected to ground, the voltage stored in the load capacitor is an output voltage of the analogue buffer.

5. A compensating operation method of an analogue buffer, the analogue buffer comprising a driving transistor and a load capacitor, wherein a storage capacitor and a switch are disposed between a gate terminal and a source terminal of the driving transistor, and a drain terminal of the driving transistor is connected to an operation voltage source, the load capacitor is disposed between an connection of the switch and the source terminal and ground, wherein the compensating operation method comprising:

during a compensation period, the switch is turned on and the storage capacitor is coupled to the operation voltage source, thereby a voltage drop is stored in the storage capacitor; and during a data-input period, an input voltage is applied to a connection between the storage capacitor and the switch, thereby the gate terminal of the driving transistor is applied with the input voltage and the voltage difference hold in the storage capacitor, and an output voltage of the analogue buffer is compensated by the voltage stored in the storage capacitor.

6. The compensating operation method as claimed in claim 5, wherein during a predetermined time interval after stopping the storage capacitor being coupled to the operation voltage source, the switch is turned off.

7. The compensating operation method as claimed in claim 6, wherein the active load is a low temperature poly-Si (LIPS) thin film transistor (TFT) and is controlled by a bias voltage.

8. A display having a plurality of source-follower type analogue buffers for driving the load capacitance of a plurality of data buses in the display, each of the source-follower type analogue buffer comprising:

a storage capacitor, wherein a first terminal of the storage capacitor is connected to an operation voltage source through a first switch, a second terminal of the storage capacitor is connected to an input voltage source through a third switch;

a driving transistor, wherein a gate terminal of the driving transistor is connected to the first terminal of the storage capacitor, a drain terminal of the driving transistor is connected to the operation voltage source, a source terminal of the driving transistor is connected to the second terminal of the storage capacitor through a second switch; and an active load, wherein a first terminal of the active load is connected to the source terminal of the driving transistor, and a second terminal of the active load is connected to the ground, the active load is controlled by a bias voltage.

9. The display as claimed in claim 8, each of the source-follower type analogue buffer comprising further comprising a load capacitor, wherein a first terminal of the load capacitor is connected to the source terminal of the driving transistor through a fourth switch, a second terminal of the load capacitor is connected to ground, the voltage stored in the load capacitor is an output voltage of the source-follower type analogue buffer.

10. The display as claimed in claim 8, wherein the driving transistor is a low temperature poly-Si (LIPS) thin film transistor (TFT).

11. The display as claimed in claim 8, wherein the active load is a low temperature poly-Si (LIPS) thin film transistor (TFT).

* * * * *